US007090085B1

(12) United States Patent
Vicendese et al.

(10) Patent No.: US 7,090,085 B1
(45) Date of Patent: Aug. 15, 2006

(54) TROPHY SPORTS APPARATUS HOLDER

(75) Inventors: James A. Vicendese, Ellicott City, MD (US); James F. Vicendese, Jr., Ellicott City, MD (US)

(73) Assignee: Batpro, Inc., Ellicott City, MD (US)

( * ) Notice: Subject to any disclaimer, the term of this patent is extended or adjusted under 35 U.S.C. 154(b) by 198 days.

(21) Appl. No.: 10/689,249

(22) Filed: Oct. 20, 2003

(51) Int. Cl.
*A47F 5/08* (2006.01)

(52) U.S. Cl. ............... 211/106.01; 211/85.7; 211/87.01; 403/381

(58) Field of Classification Search ............ 211/85.26, 211/106.01, 85.7, 113, 87.01, 70.2, 70.5; 248/476, 309.1, 304, 305; 40/666, 658, 642.02; 403/381, 331, 339, 340
See application file for complete search history.

(56) References Cited

U.S. PATENT DOCUMENTS

| | | | | |
|---|---|---|---|---|
| 2,779,114 A | * | 1/1957 | Orthwine | 40/658 |
| 3,650,407 A | * | 3/1972 | Benham, Jr. | 211/14 |
| 4,019,298 A | * | 4/1977 | Johnson, IV | 52/590.1 |
| 4,564,732 A | * | 1/1986 | Lancaster et al. | 200/307 |
| 4,595,226 A | | 6/1986 | Wessel | |
| 4,629,065 A | | 12/1986 | Braaten | |
| 4,807,763 A | | 2/1989 | Jankovsky | |
| 4,882,862 A | * | 11/1989 | Slavsky, Sr. | 40/324 |
| 4,936,467 A | | 6/1990 | Bobeczko | |
| 5,035,389 A | * | 7/1991 | Wang | 248/224.51 |
| 5,203,462 A | | 4/1993 | Brooks | |
| 5,244,300 A | * | 9/1993 | Perreira et al. | 403/381 |
| 5,356,038 A | * | 10/1994 | Banks | 222/105 |
| 5,413,228 A | * | 5/1995 | Le Clerc | 211/13.1 |
| 5,433,416 A | * | 7/1995 | Johnson | 248/475.1 |
| 5,435,511 A | * | 7/1995 | Hsu | 248/206.3 |
| 5,664,793 A | * | 9/1997 | Engibarov | 279/124 |
| 5,706,737 A | | 1/1998 | Whitehead et al. | |
| 5,819,456 A | * | 10/1998 | Schwartz | 40/642.01 |
| 5,823,360 A | | 10/1998 | Gorosave | |
| 5,871,092 A | | 2/1999 | Rogers et al. | |
| 5,871,105 A | | 2/1999 | Whitehead et al. | |
| 6,053,340 A | | 4/2000 | Cameron | |
| 6,637,707 B1 | * | 10/2003 | Gates et al. | 248/224.7 |
| 6,932,223 B1 | * | 8/2005 | Lee et al. | 211/70.6 |
| 2002/0144962 A1 | * | 10/2002 | Dettorre et al. | 211/85.7 |

\* cited by examiner

*Primary Examiner*—Jennifer E. Novosad
(74) *Attorney, Agent, or Firm*—William S. Ramsey

(57) ABSTRACT

The trophy item holder is a holder which associates the trophy item with a descriptive card which provides information on the item and its user. Photographs or a certificate of authenticity may also be displayed. Thus the information establishing the item as a trophy item is on display while the item itself is available for handling, examining, handling, etc. The trophy item may be displayed in a vertical or horizontal orientation. The holder is removably attached to a wall and, when attached, presents an appearance free of screws or other fasteners.

9 Claims, 9 Drawing Sheets

TROPHY SPORTS APPARATUS HOLDER

CROSS-REFERENCE TO RELATED APPLICATIONS

Not Applicable.

STATEMENT REGARDING FEDERALLY SPONSORED RESEARCH OR DEVELOPMENT

Not Applicable.
Reference to a "Microfiche appendix."
Not Applicable

BACKGROUND OF THE INVENTION

1. Field of the Invention

This invention relates to holders for various sports apparatus trophies, especially bat holders.

2. Description of Related Art Including Information Disclosed Under 37 CFR 1.97 and 37 CFR 1.98.

This invention is a sporting trophy holder, for trophy sporting items such as baseball bats, tennis racquets, sporting arms, fishing poles, etc., which supports and displays the trophy item on a wall in a vertical or horizontal position supported by the item handle. The holder has at the top a clip which retains a card with descriptive material concerning the trophy item. The trophy item holder supports the trophy in a vertical or horizontal position and allows the easy removal and replacement of the trophy item on the holder.

U.S. Pat. No. 4,595,226 discloses a ball and bat carrier which holds bats and balls for carrying to the ball field and may be attached to a wire fence to make the bats and balls available for use in play. The bats are retained in a horizontal position for transportation and are held by the handle by wire fingers in a vertical position for use during the game.

U.S. Pat. No. 4,629,065 discloses a tubular baseball equipment holder which is mounted on a wall or fence and holds bats in a vertical position by the handle. The bats handles are placed in openings in the tube.

U.S. Pat. No. 4,807,763 discloses a portable stand for bats. The bats are retained in a vertical position by bat positioning apertures in arms.

U.S. Pat. No. 4,936,467 discloses a sports equipment rack for wall mounting in which bats are suspended by the handles in a vertical position by notches in holders at either end of the rack.

U.S. Pat. No. 5,203,462 discloses a rack for wall mounting in which bats are held in a horizontal position by hooks.

U.S. Pat. No. 5,706,737 discloses a sport shelf with a baseball bat holder (54 in FIG. 4) suspended from a rod member.

U.S. Pat. No. 5,823,360 discloses a holder for sports equipment with a pair on prongs at the lower end for holding a baseball bat by the handle in a vertical position.

U.S. Pat. No. 5,871,092 discloses a display tube made of transparent plastic with end caps for mounting and display of a bat in a horizontal or vertical position. End caps hold the tube and may be mounted on a wall. Single or multiple bats may be displayed in adjacent position.

U.S. Pat. No. 5,871,105 discloses a storage apparatus in which bats are stored vertically by a rod mounted hook member.

U.S. Pat. No. 6,053,340 discloses a sports equipment storage rack with a U-shaped bat holder hook.

None of the discovered prior art holders fulfill the functions of the present invention, that of providing an attractive holder which supports the trophy in a horizontal or vertical orientation and with a removable descriptive card clip which is locked in place when the holder is mounted on the wall.

BRIEF SUMMARY OF THE INVENTION

This patent application discloses in a first embodiment a trophy bat holder comprising a support plate, the support plate having a platform on the front side of the support plate, and the support plate capable of attachment to a wall. A bat support has a front side with a U-shaped arm mounted by a neck to the front side of the bat support. The bat support has a back side with a cavity on the back side. The bat support is capable of removably mounting to the support plate by sliding interaction of the platform of the support plate with the cavity on the back side of the bat support. The bat support has a notch on the back side near the top of the bat support. A clip has a clasp at the top of the clip, a tab on the bottom of the clip, and a flange on the clip tab. The clip is removably mounted to the top of the bat support, the clip retained mounted to the bat support by interaction between the notch on the bat support and the flange on the clip tab when the bat support is mounted on the support plate.

One objective of this invention is to provide a trophy item holder for displaying trophy items along with descriptive material concerning the item.

The objective of one embodiment of this invention is to provide a trophy item holder for displaying a trophy item in a horizontal or vertical orientation or at an intermediate orientation.

Another objective of one embodiment of this invention is to provide a trophy item holder with an attached descriptive card, photograph, or certificate of authenticity.

Another objective of one embodiment of this invention is to provide a trophy item holder with an attractive, smooth appearance free from disruption by attachment devices.

Another objective of one embodiment this invention is to provide a trophy item holder which can easily and quickly removed from a supporting wall and moved to another location.

Another objective of one embodiment of this invention is to provide a trophy item holder which can be manufactured inexpensively from readily available materials and without adverse effect on the environment.

DETAILED DESCRIPTION OF SOME OF THE EMBODIMENTS OF THE INVENTION

Figure 1:
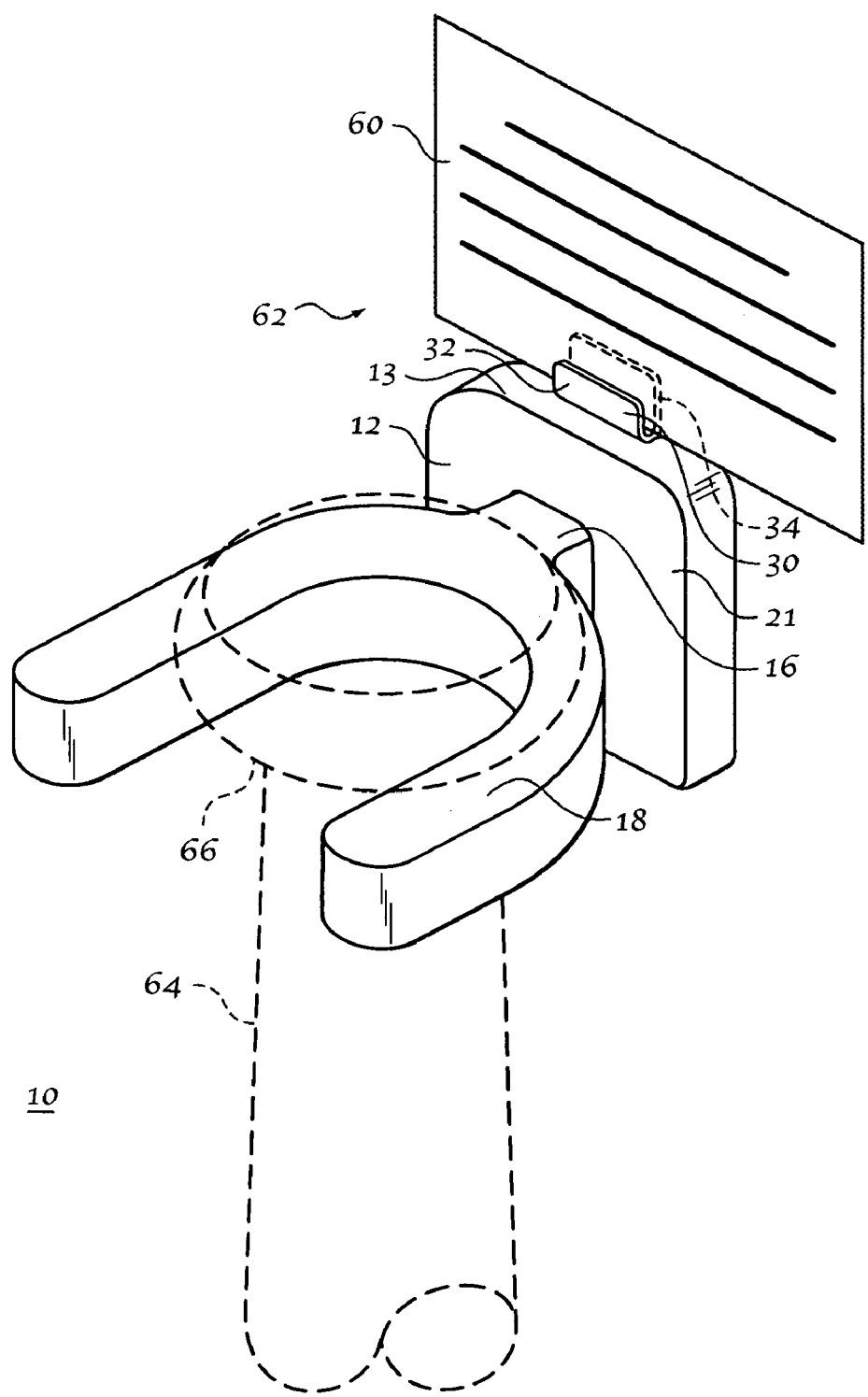
FIG. 1 is a perspective view of the first embodiment item holder mounted on a wall.

FIG. 1 is a perspective view of the first embodiment trophy item holder, the bat holder 10 mounted on a wall 62. Visible in FIG. 1 is the item support 12, comprised of a support wall 21, a neck 16 attached to the front side 11 of the support wall 21, and a item retainer, here in the first embodiment a U-shaped arm 18 attached to the neck 16. A bat 64 is shown in dashed lines in place on the item holder. The bat is retained in place by the U-shaped arm 18 which holds the bat knob 66. A clip 30 is located at the top 13 of the support wall 21. The clip 30 has clasp 29 comprising a front wing 32 and back wing 34, shown in dashed line. A card 60 is removably retained by the clip 30. The card has indicia which may describe the user of the item, the occasion of use if relevant, and a certificate of authenticity. It also may include a photograph of the item and famous user of the item.

Figure 2:
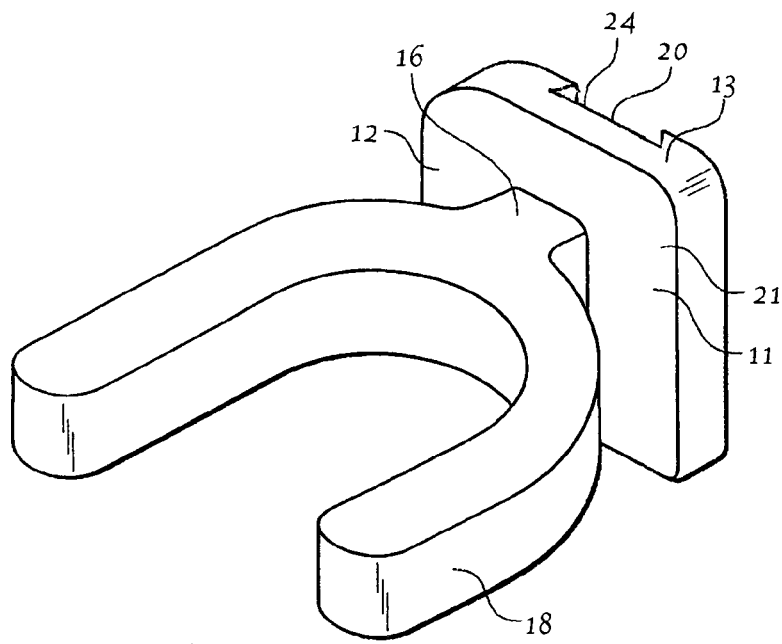
FIG. 2 is a perspective view of the front of the first embodiment item support.

FIG. 2 is a perspective view of the front of the item support 12. Visible in FIG. 2 are the U-shaped arm 18 attached by a neck 16 to the front side 11 of the support wall 21. A notch 20 is at the back of the top 13 of the wall with a lip 24 at the top of the notch. The notch 20 accommodates the clip when the item support is mounted on a wall. The lip 24 retains the clip in place (see FIG. 9).

Figure 3:
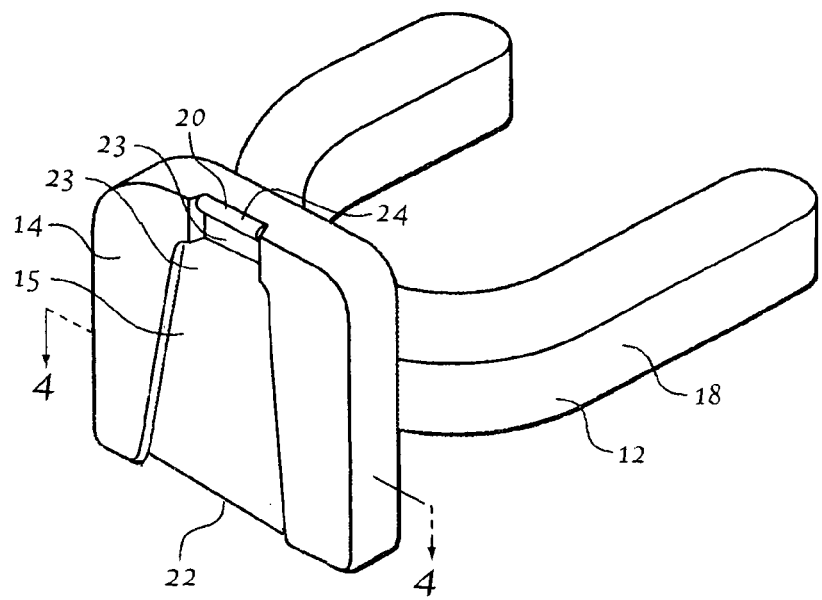
FIG. 3 is a perspective view of the back of the first embodiment item support.

FIG. 3 is a perspective view of the back of the item support 12. FIG. 3 shows the U-shaped arm 18, the back side 14 of the item support 12, and the cavity 15 in the back of the support. The cavity 15 is open at the bottom 22. The notch 20 which accommodates the clip is visible at the top 13 of the support wall 21. The top 23 of the cavity 15 is narrower than the opening at the bottom 22. An undercut groove 23 is cut into the notch 20, forming a lip 24 at the top of the notch 20.

Figure 4:
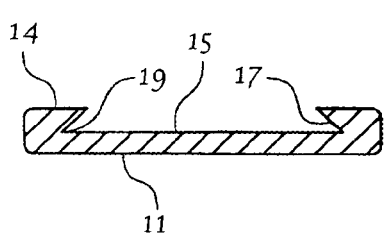
FIG. 4 is a cross section of the first embodiment item support taken at line 4—4 of FIG. 3.

FIG. 4 is a cross section of the item support taken at line 4—4 of FIG. 3. FIG. 4 shows the front side 11, back side 14, and cavity 15. There is a right side cavity wall 19 undercut and a left side cavity wall 17 undercut in the right and left sides of the cavity respectively. The right 19 and left 17 cavity walls are at an obtuse angle to the back side 14 of the item support 12.

Figure 5:
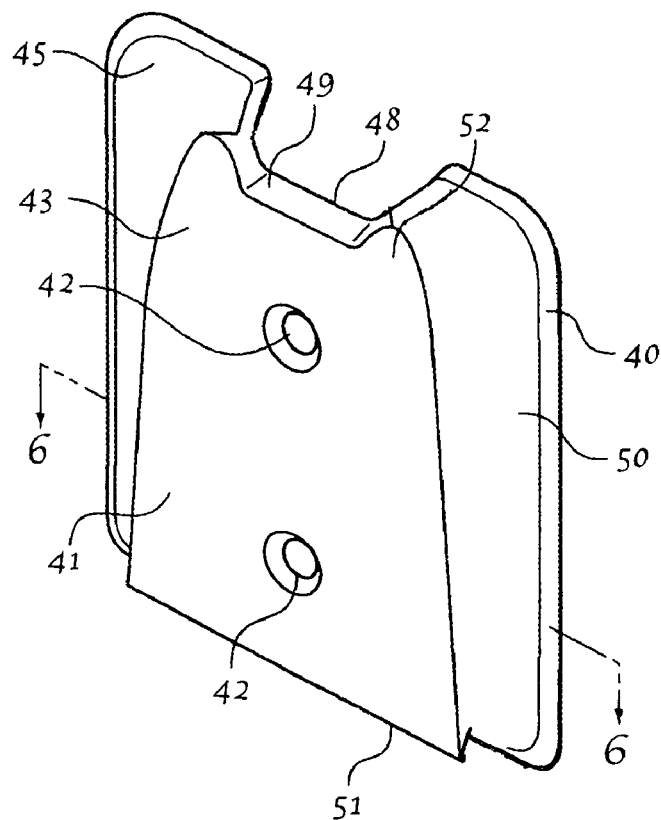
FIG. 5 is a perspective view of the front of the support plate.

FIG. 5 is a perspective view of the front of the support plate 40. A platform 41 is located on the front of the support plate 40. Two holes 42 penetrate the support plate and are used with fasteners to attach the support plate to a vertical surface, such as a wall (not shown in FIG. 5). Any suitable fastener may be used to attach the support plate to a vertical surface, such as screws, bolts, or nails. The platform 41 extends from the base 45 of the support plate. The base 45 has a front side 50 and a back side 44 (not shown in FIG. 5). The bottom edge 51 is wider than the top edge 52 of the platform 41. A notch 48 is visible at the top of the base 50. Another notch 49 is visible at the top of the platform 41. Notch 48 extends down into the base 50 below the level of notch 49 in the top of the platform. Notch 48 accommodates the tab (36 in FIG. 7) of the clip.

Figure 6:
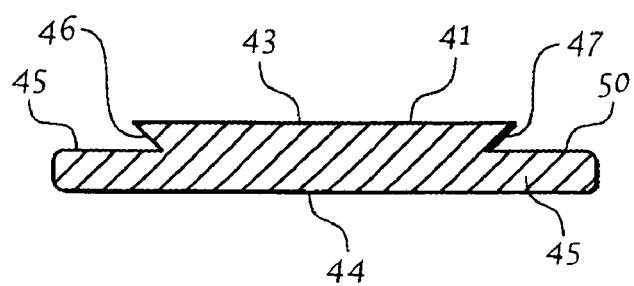
FIG. 6 is a cross section of the support plate taken at line 5—5 of FIG. 5.

FIG. 6 is a cross section of the support plate taken at line 5—5 of FIG. 5. Visible in FIG. 6 is the back side 44 and the front side 50 of the base 45. The front 43 of the platform 41 also is shown. There is a right side 47 platform wall undercut and a left side 46 platform wall undercut in the right and left sides of the platform respectively. The right 47 and left 46 platform walls are at an acute angle to the front side 43 of the platform 41.

Figure 7:
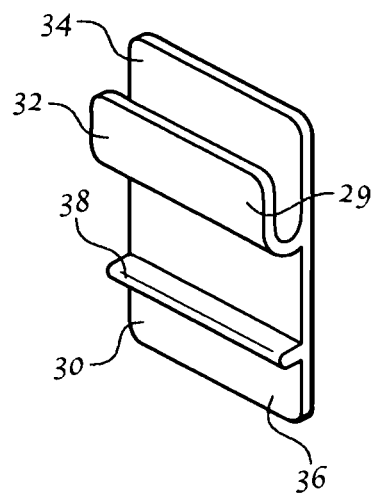
FIG. 7 is a perspective view of the front of the first embodiment clip.

FIG. 7 is a perspective view of the front of the first embodiment clip 30. FIG. 7 shows the tab 36 at the bottom of the clip, and the clasp 29 comprised of the front wing 32 and back wing 34. A bead 38 runs across tab 36. The bead 38 is used to retain the clip in place when the item support is attached to the support plate. A card or other descriptive material (not shown in FIG. 7) is retained by the clasp.

Figure 8:
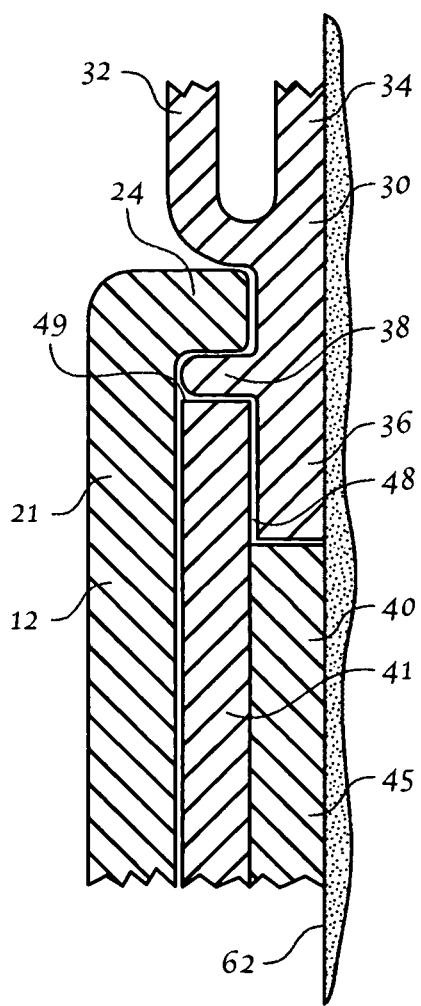
FIG. 8 is a cross section view of the assembled first embodiment item holder showing the clip, top of the bat support, and top of the support plate.

FIG. 8 is a cross section view of top of the assembled first embodiment trophy item holder showing the relationship between the clip, top of the item support, and top of the support plate. The support plate 40 is attached to the wall 62 by the base 45. The tab 36 of the clip 30 is inserted into the notch 48 behind the platform 41 of the support plate 40. The bead 38 on the tab 36 of the clip 30 rests on the notch 49 at the top of the platform 41. The lip 24 on the back of the support wall 21 of the item holder 12 retains the bead 38 on the tab 36 of the clip 30.

The first embodiment trophy item holder is assembled by placing the bead 38 of the clip 30 below the lip 24 on the support wall 21 of the item holder 12. The item holder 12 is then slid over the support plate 40 with interaction between the left and right side cavity wall undercuts of the item support (17 and 19 of FIG. 4, respectively) and the left and right side platform wall undercuts (46 and 47 of FIG. 6, respectively) of the support plate 40. The bat holder is removably retained attached to the support plate by the interaction of the item support cavity and the platform of the support plate. The clip is removably retained attached to the top of the first embodiment trophy item holder by the interaction of the bead on the clip with the lip at the top of the bat holder.

Figure 9:
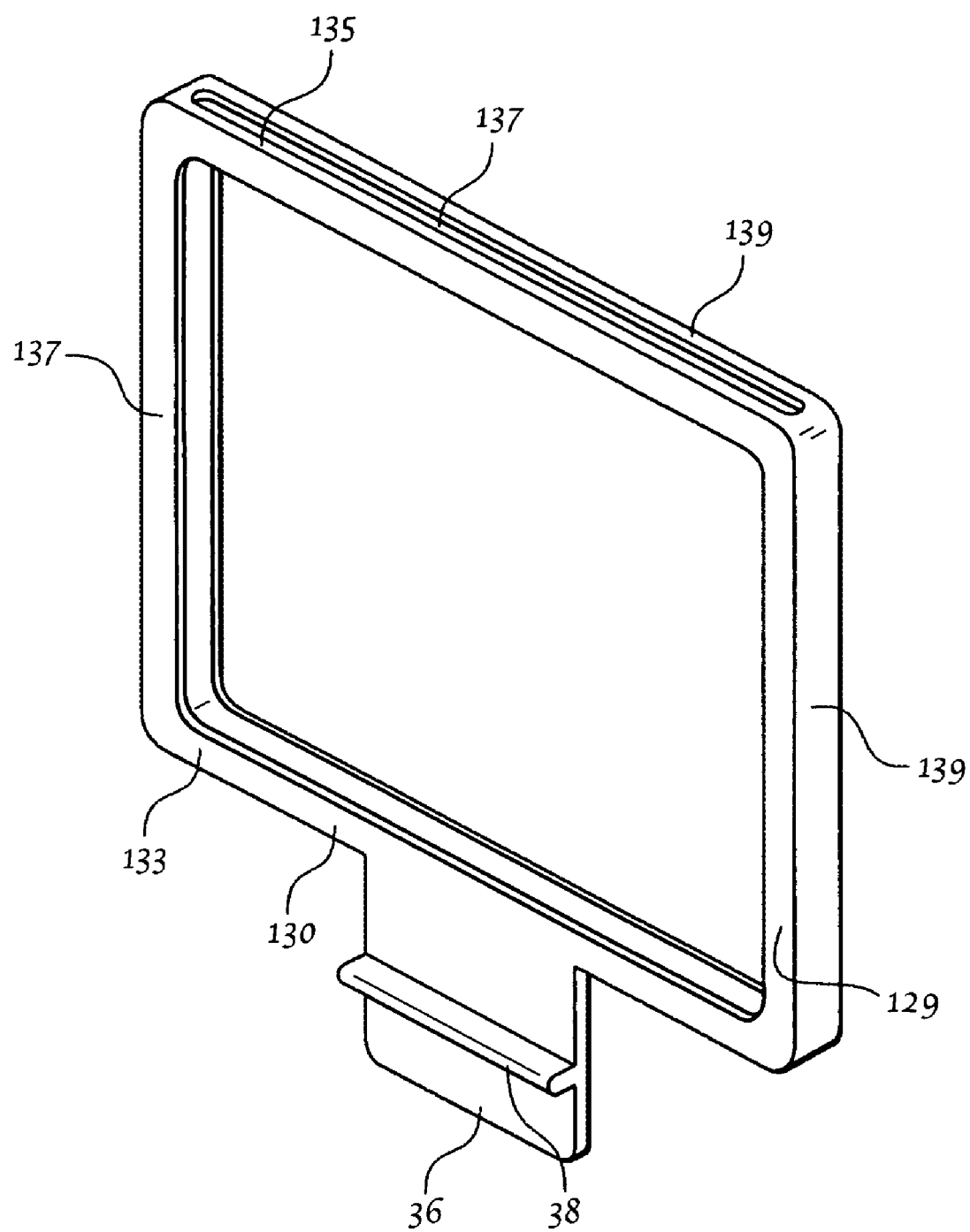
FIG. 9 is a plan view of the second embodiment clip.

FIG. 9 is a plan view of the second embodiment clip 130. A tab 36 at the bottom of the clip and a bead 38 which runs across the tab are the same as in the first embodiment clip. The clasp 129 of the second embodiment clip is attached to the top of the tab and is designed to enclose descriptive material retained by the clasp. The clasp 129 is comprised of a U-shaped bottom 133, left 137 and right 139 sides which retain descriptive material between the arms of the bottom, left, and right sides. The top side 135 is comprised of a front part 137 and rear part 139. Descriptive material is inserted between the front part and rear part and retained between the front and rear part of the top side and the arms of the U-shaped bottom, left, and right sides.

Figure 10:
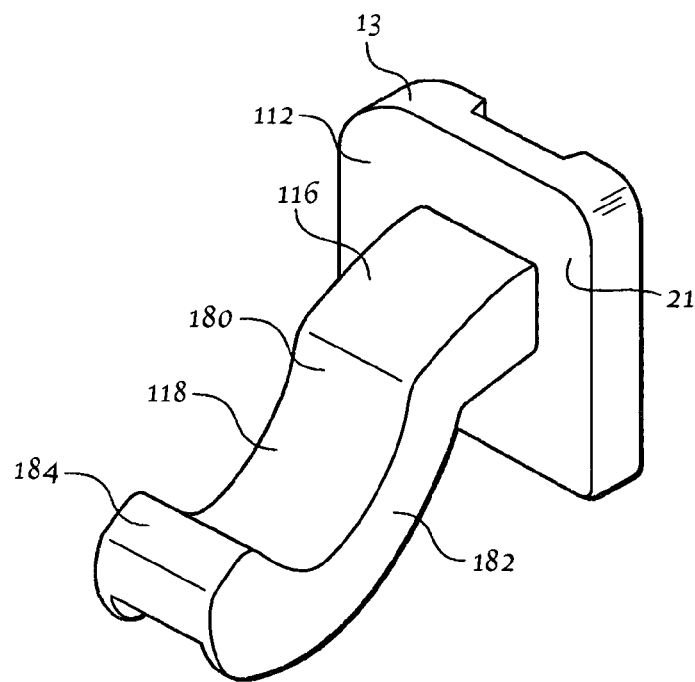
FIG. 10 is a perspective view of the top of the second embodiment trophy item holder.

FIG. 10 is a perspective view of the top of the second embodiment 112 trophy item holder. The second embodiment trophy item holder is like the first embodiment except for the structure of the item retainer which is in the form of a hook rather than the U-shaped arm in the first embodiment trophy item holder. The support plate, clip, and interaction between support plate, support wall, and clip is identical to that of the first embodiment trophy item holder. FIG. 10 shows the second embodiment trophy item holder 112. FIG. 10 shows a support wall 21, the top 13 of the support wall, a neck 116, hook-shaped arm 118 attached to the neck 116. The hook-shaped arm 118 has a top side 180, and a right side 182, a left side (not visible in FIG. 10), both sides attached by one edge to edges of the top side 180. An end 184 is attached to the ends of the top, right side, and left side.

Figure 11:
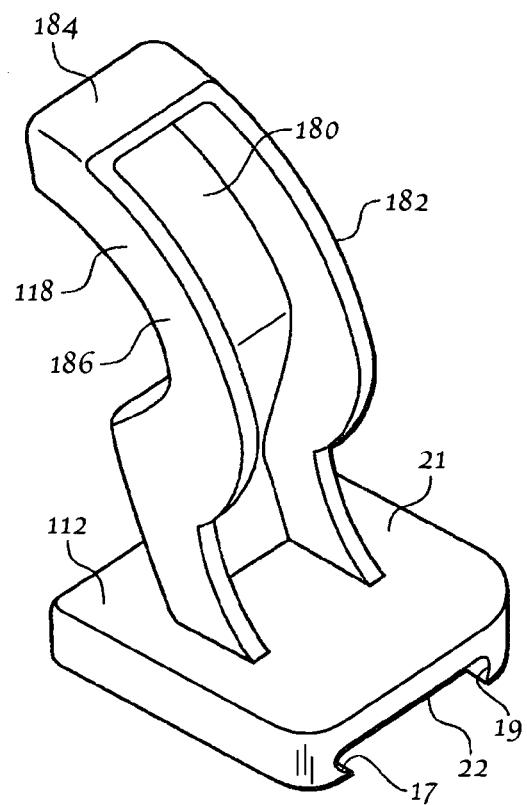
FIG. 11 is a perspective view of the bottom of the front of the second embodiment trophy item holder.

FIG. 11 is a perspective view of the bottom of the front of the second embodiment 112 trophy item holder. This view makes clear that the hook-shaped arm 118 is comprised of a left side 186, right side 182, and top 180 and an end 184 which is attached to the ends of the top, right side, and left sides. Also visible in FIG. 11 is the support wall 21, the bottom of the cavity 22 in the support plate 21, and the undercut in the left side 17 and in the right side 19 of the back of the support wall 21.

The second embodiment trophy item holder may be used along to support and display items which are appropriately held by a hook, such as a trophy baseball glove or hat or helmet. In addition, the second embodiment can be used in conjunction with the third embodiment trophy item holder to support and display items such as a baseball bat or firearm in a horizontal orientation (see FIG. 16).

Figures 12, 13:
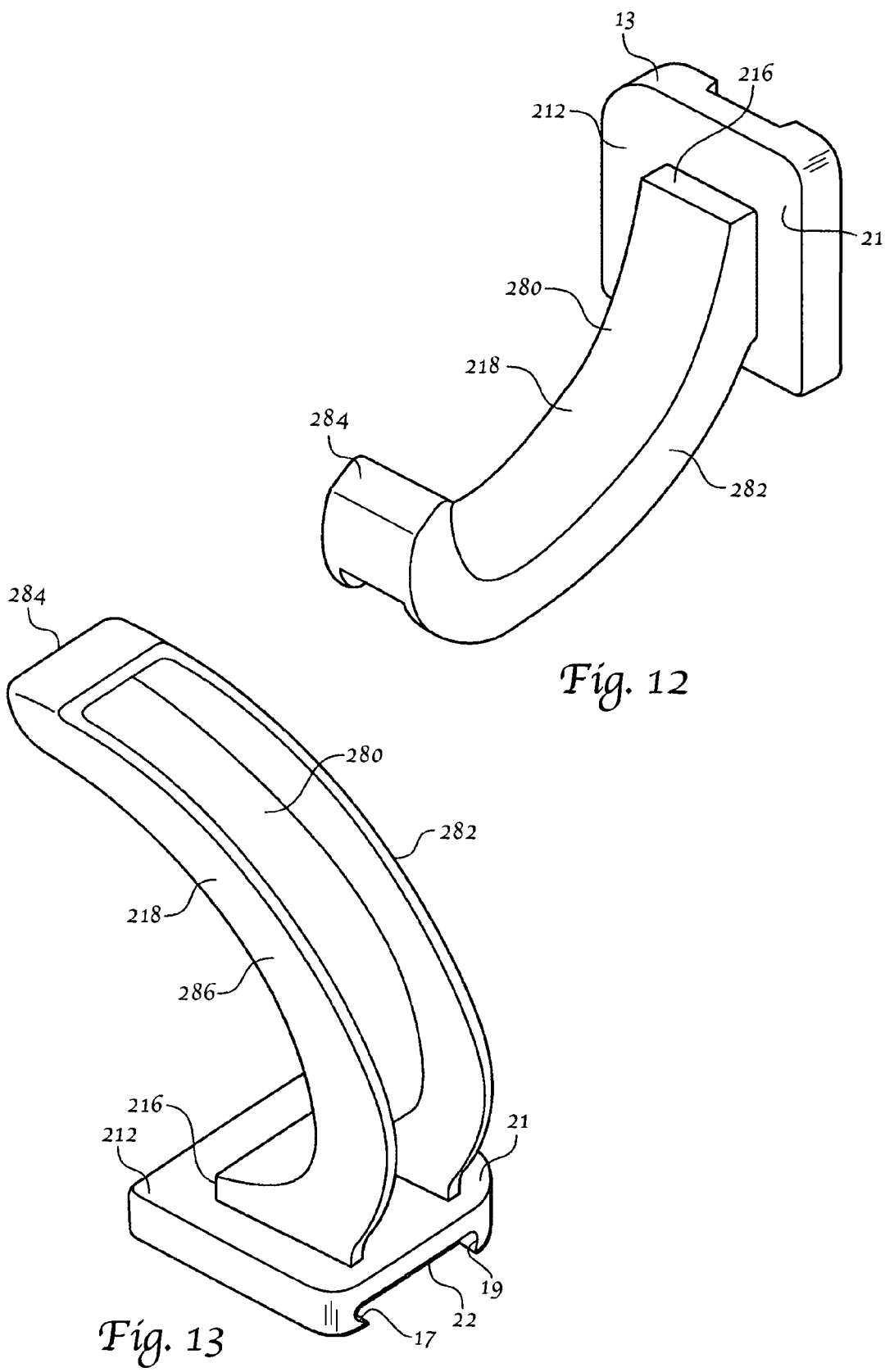
FIG. 12 is a perspective view of the front of the third embodiment item holder.
FIG. 13 is a perspective view of the bottom of the front of the third embodiment item holder.

FIG. 12 is a perspective view of the top of the third embodiment 212 trophy item holder. The third embodiment trophy item holder is like the first embodiment except for the structure of the item retainer which is in the form of a hook rather than the U-shaped arm in the first embodiment trophy item holder. The support plate, clip, and interaction between support plate, support wall, and clip is identical to that of the first embodiment trophy item holder. The third embodiment trophy item holder is identical to the second embodiment except the hook-shaped holder of the third embodiment is larger than the hook-shaped holder of the second embodiment. FIG. 12 shows the third embodiment trophy item holder 212. FIG. 12 shows a support wall 21, the top 13 of the support wall, a neck 216, extended hook-shaped arm 218 attached to the neck 216. The extended hook-shaped arm 218 has a top 280, and a right side 282, a left side (not visible in FIG. 12), both sides attached by one edge to edges of the top 280. An end 284 is attached to the ends of the top, right side, and left side.

FIG. 13 is a perspective view of the bottom of the front of the third embodiment 212 trophy item holder. This view makes clear that the hook-shaped arm 218 is comprised of a left side 286, right side 282, and top 280 and an end 284 which is attached to the ends of the top, right side, and left sides. Also visible in FIG. 12 is the support wall 21, the bottom of the cavity 22 in the support plate 21, and the undercut in the left side 17 and in the right side 19 of the back of the support wall 21.

The third embodiment trophy item holder may be used along to support and display items which are appropriately held by a large hook, such as a trophy chest protector. In addition, the third embodiment can be used in conjunction with the second embodiment trophy item holder to support and display items such as a baseball bat or firearm in a horizontal orientation (see FIG. 16).

Figure 14:
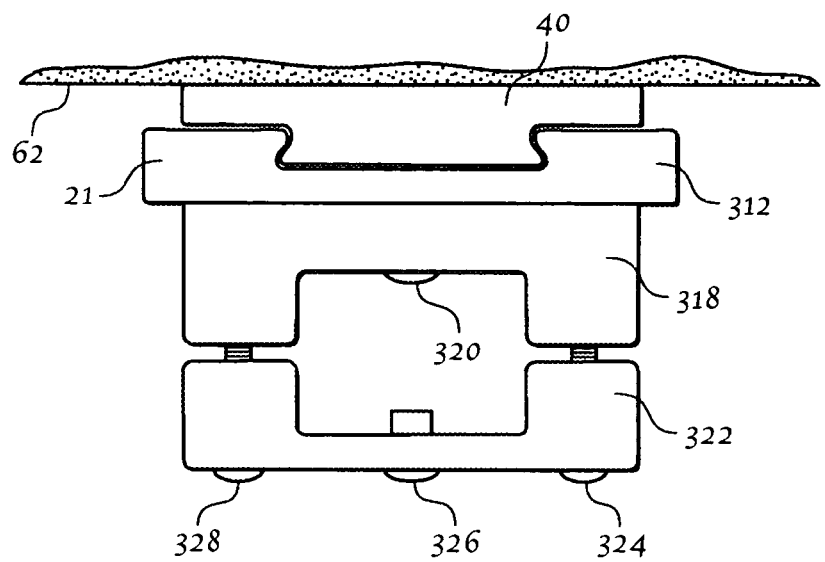
FIG. 14 is a plan view of the top of the fourth embodiment item holder.
Figure 15:
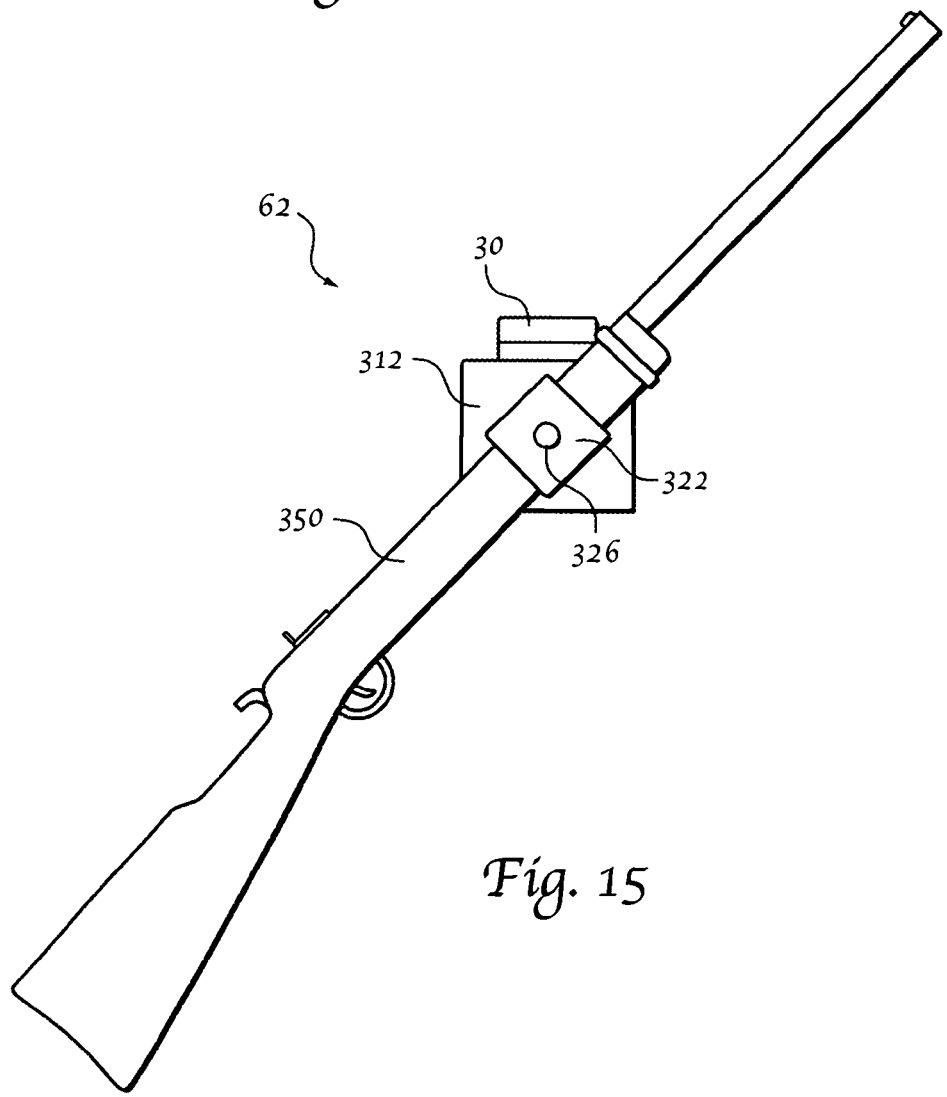
FIG. 15 is a plan view of the front of the fourth embodiment item holder showing a trophy firearm being displayed.
Figure 17:
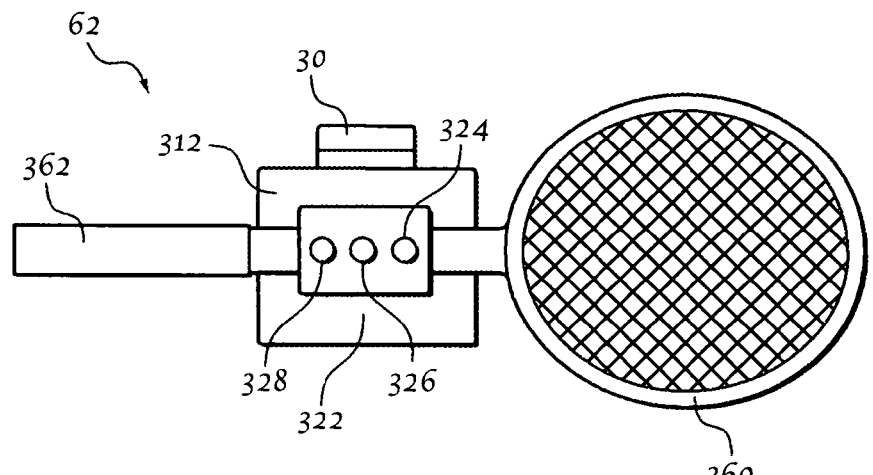
FIG. 17 is a plan view of the front of the fourth embodiment item holder showing a trophy tennis racket being displayed.

FIG. 14 is a plan view of the top of the fourth embodiment trophy item holder. The fourth embodiment item holder 312 is shown attached to a wall 62 via the same support plate 40 as in the first embodiment trophy item holder. The support plate 40 interacts with the support wall 21 which is the same as in the first embodiment trophy item holder. A rear U-shaped member 318 is rotatably attached to the support wall 21 by a rotating fastener 320. The rear U-shaped member 318 may be rotated about the fastener 320 which then may be used to secure the rear U-shaped member 318 in any position with respect to the support wall 21. A front U-shaped member 322 is removably attached to the rear U-shaped member 318 by a left fastener 328 and a right fastener 324. Removal or loosening of the fasteners allows removal of the front U-shaped member to facilitate attachment of a trophy item to the fourth embodiment item holder. The front sides of the U-shaped members are rectangular or square in shape, as is shown in FIGS. 15 and 17. The fasteners are any suitable strong removable fasteners, such as screws, bolts, or pins.

FIG. 15 is a plan view of the front of the fourth embodiment item holder showing a trophy firearm being displayed. The fourth embodiment item holder 312 is attached to the wall 62 and the firearm 350 is retained by the adjustment screw 326 between the front U-shaped member 322 and the rear U-shaped member (not shown in FIG. 15). Note that in FIG. 15 the rear U-shaped member has been rotated about the attachment screw 320 (not shown in FIG. 15) so that the long axis of the trophy item is at an approximately 45° angle to the horizontal. The first embodiment clip 30 is shown at the top of the third embodiment trophy item holder.

Figure 16:
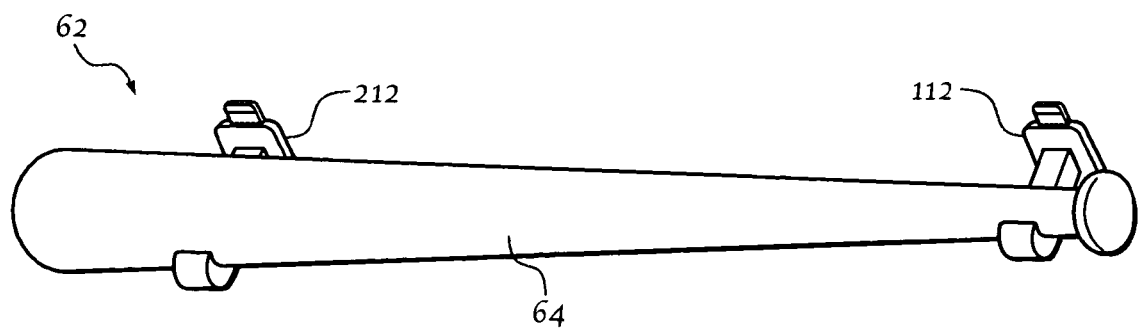
FIG. 16 is a plan view of the second and third embodiment item holders showing a trophy bat being displayed.

FIG. 16 is a plan view of the second and third embodiment item holders showing a trophy bat being displayed. The second embodiment item holder 112 and third embodiment item holder 212 are attached to a wall 62 and a baseball bat 64 is held in a horizontal position between the two holders. The relatively small diameter end of the bat is retained by the second embodiment trophy item holder, and the relatively large diameter end of the bat is retained by the third embodiment trophy item holder. The first embodiment clip 30 is shown in connection with the second and third embodiment item holders.

FIG. 17 is a plan view of the front of the fourth embodiment item holder showing a trophy tennis racket being displayed. The fourth embodiment trophy item holder 312 is shown attached to a wall 62 and a tennis racket 360 is retained by its handle 362 between the front U-shaped member 322 and the rear U-shaped member (not visible in FIG. 17). The adjustment screw 326 and the left 328 and right 324 securing screws are shown, as well as the first embodiment clip 30.

Figure 18:
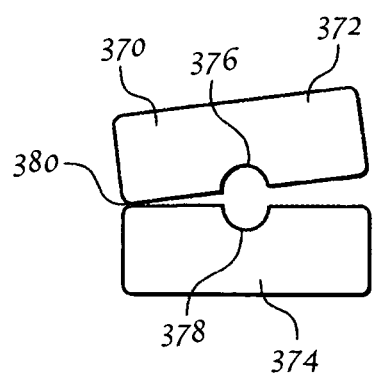
FIG. 18 is a top view of the insert used with the fourth embodiment item holder.

FIG. 18 is a top view of an insert 370 used in conjunction with the fourth embodiment trophy item holder. The insert is used to hold for display trophy items having a relatively small cross section, such as a fishing rod, riding quirt, hunting arrow or fencing epee. The insert is grasped between and retained by the rear U-shaped member 318 and front U-shaped member 322 of the fourth embodiment trophy item holder (shown in FIG. 14). The insert 370 is comprised of a front block 374 connected by a living hinge to a rear block 372. Alternatively each block may be detached. A hemispheric notch 378 and 376 traverses the front and rear block, respectively. In use, the trophy item is placed in the notches, the front and rear blocks are closed around the trophy item, and the insert and trophy item are placed into and secured between the rear U-shaped member and the front U-shaped member of the fourth embodiment trophy item holder. The insert is constructed from any suitable soft and relatively flexible material, such as rubber, polystyrene, or other plastic.

The various embodiments of the present invention described in this disclosure may be manufactured by any suitable hard and strong materials, such as steel, plastic, or wood. A preferred material of construction is plastic. A preferred method of manufacture is molding.

It will be apparent to those skilled in the art that the examples and embodiments described herein are by way of illustration and not of limitation, and that other examples may be used without departing from the spirit and scope of the present invention, as set forth in the appended claims.

We claim:

1. A trophy item holder comprising:
   a support plate having a front and a back side, the support plate having a platform of uniform thickness on the front side of the support plate, the support plate capable of attachment to a vertical surface at the back side, wherein the support plate platform is wider at the bottom of the support platform than at the top of the support platform and the walls of the support platform are undercut,
   an item support having a front side and a back side, with a cavity on the back side, wherein the cavity on the back side of the item support is wider at the bottom of the item support than at the top of the item support and the walls of the cavity on the back side of the item support are at an obtuse angle to the back wall of the item support,
   an item retainer capable of holding a trophy item attached to the front side of the item support,
   the item support capable of removably mounting to the support plate by interaction of the platform of the support plate with the back side of the item support,
   the item retainer capable of removably attaching a trophy item to the item support,
   and a clip having a clasp at the top of the clip and a single tab at the bottom of the clip, the clip removably mounted by the tab to the top of the item support.

2. The trophy item holder of claim 1 wherein the interaction of the platform of the support plate with the back side of the item support is sliding interaction of the cavity on the back side of the item support with the platform of the support plate.

3. The trophy item holder of claim 1 wherein the item retainer is a U-shaped arm.

4. The trophy item holder of claim 1 wherein the support plate is capable of attachment to a wall through holes in the support plate for fastener devices.

5. The trophy item holder of claim 1 wherein the support plate is capable of attachment to a wall through screws, nails or bolts.

6. The trophy item holder of claim 1 wherein the clasp has a front wing and a rear wing.

7. The trophy item holder of claim 1 wherein the item retainer is capable of holding a baseball bat.

8. A trophy item holder comprising:
   a support plate having a front and a back side, the support plate having a platform on the front side of the support plate, the support plate capable of attachment to a vertical surface at the back side, the support plate capable of attachment to a vertical surface by screws, bolts or nails,
   an item support having a front side and a back side, the item support having a notch and a lip at the back side at the top of the item support,
   an item retainer attached to the front side of the item support, the item retainer comprising a U-shaped arm, the item retainer capable of attaching a baseball bat to the item support,
   the item support having a cavity on the back side,
   the item support capable of removably mounting to the support plate by sliding interaction of the platform of the support plate with the cavity on the back side of the item support, and
   a clip having a clasp at the top of the clip, a tab at the bottom of the clip, and a bead on the tab,
   the clip removably mounted by the tab to the top of the item support with the clip retained in position by interaction of the tab with the lip on the item support.

9. A trophy item holder comprising:
   a support plate having a front and a back side, the support plate having a platform on the front side of the support plate, the support plate capable of attachment to a vertical surface at the back side,
   an item support having front side and a back side,
   an item retainer capable of holding a trophy item attached to the front side of the item support,
   the item support capable of removably mounting to the support plate by interaction of the platform of the support plate with the back side of the item support,
   the item retainer capable of removably attaching a trophy item to the item support,
   and a clip having a clasp at the top of the clip and a tab at the bottom of the clip,
   the clip removably mounted by the tab to the top of the item support,
   wherein the item support has a notch at the top of the item support with a lip on the back side of the item support, the clip has a bead on the tab, and the clip is removably attached to the top of the item support by interaction of the lip and the bead.

\* \* \* \* \*